United States Patent
Hidaka et al.

(10) Patent No.: US 6,228,417 B1
(45) Date of Patent: May 8, 2001

(54) FAT COMPOSITION AND FROTHING OIL-IN-WATER EMULSION

(75) Inventors: Hiroshi Hidaka, Sakai; Kuniaki Inayoshi, Sennan; Tugio Nishimoto, Naka-gun; Sayoko Yabuuchi, Matubara, all of (JP)

(73) Assignee: Fuji Oil Co., Ltd., Osaka (JP)

( * ) Notice: Subject to any disclaimer, the term of this patent is extended or adjusted under 35 U.S.C. 154(b) by 0 days.

(21) Appl. No.: 08/608,951

(22) PCT Filed: Nov. 9, 1993

(86) PCT No.: PCT/JP93/01620

§ 371 Date: Jul. 6, 1994

§ 102(e) Date: Jul. 6, 1994

(87) PCT Pub. No.: WO94/10850

PCT Pub. Date: May 26, 1994

Related U.S. Application Data

(63) Continuation of application No. 08/256,281, filed as application No. PCT/JP93/01620 on Nov. 9, 1993, now abandoned.

(30) Foreign Application Priority Data

Nov. 9, 1992 (JP) .................................................. 4-324883

(51) Int. Cl.[7] ...................................................... A23D 9/00
(52) U.S. Cl. ............................ 426/601; 426/564; 435/134
(58) Field of Search ................................... 426/601, 602, 426/564; 435/134

(56) References Cited

U.S. PATENT DOCUMENTS

| | | | | |
|---|---|---|---|---|
| 4,386,111 | * | 5/1983 | Van Heteren et al. | 426/603 |
| 4,888,196 | * | 12/1989 | Ehrman | 426/607 |
| 5,000,975 | * | 3/1991 | Tomarelli | 426/607 |
| 5,023,106 | * | 6/1991 | Ehrman | 426/607 |
| 5,066,510 | * | 11/1991 | Ehrman | 426/607 |
| 5,288,512 | * | 2/1994 | Seiden | 426/602 |
| 5,380,544 | * | 1/1995 | Klemann | 426/607 |

FOREIGN PATENT DOCUMENTS

| | | | |
|---|---|---|---|
| 0 170 431 | * | 2/1986 | (EP) . |
| 57-12950 | * | 1/1982 | (JP) . |
| 61-95098 | * | 5/1986 | (JP) . |
| 63-291550 | * | 5/1987 | (JP) . |
| 63-14675 | * | 1/1988 | (JP) . |
| 63-291550 | * | 11/1988 | (JP) . |
| 4-75593 | * | 3/1992 | (JP) . |

OTHER PUBLICATIONS

Swern 1979 Baileys Industrial Oil and Fat Products vol. 1 4th edition Wiley Interscience New York p. 311–317.*
Oboh 1987 Rev. Ital Sostanze Grasse 64(9)365–7.*
Litchfield 1970 Chem Phys Lipids 4(1) 96–103.*

* cited by examiner

*Primary Examiner*—Carolyn Paden
(74) *Attorney, Agent, or Firm*—Wenderoth, Lind & Ponack, L.L.P.

(57) ABSTRACT

The objects of the present invention are to provide a whippable oil in water type emulsion, which possesses good heat resistance, excellent melting properties in mouth, freshness and cold feeling, and to provide a fat composition suitable for preparing the emulsion. A fat composition, comprising 25–60% of glycerides, of which constituent fatty acid residue has not more than 38 total carbon atoms, 25–50% of glycerides, of which constituent fatty acid residue has 42–46 total carbon atoms, and 5–25% of glycerides, of which constituent fatty acid residue has not less than 48 total carbon atoms was prepared by mixing laurin fats or hydrogenated products thereof which contain fatty acid residues with 16–24 carbon atoms or esters thereof, or a fat being rich in glycerides with fatty acid residues containing 16–24 carbon atoms, transesterifying them by a known method in the presence of a lipase having 1,3-specificity, and, if necessary, extremely hydrogenating them. Then, the fat composition obtained is used to prepare the whipping oil in water emulsion.

4 Claims, No Drawings

FAT COMPOSITION AND FROTHING OIL-IN-WATER EMULSION

This application is a continuation of now abandoned application, Serial No. 08/256,281, filed Jul. 6, 1994, now abandoned which was the National Stage of International Application No. PCT/JP93/01620 filed Nov. 9, 1993.

BACKGROUND OF THE INVENTION

1. Field of the Invention

The present invention relates to a fat composition which has a specific composition, and a whippable oil in water (o/w) emulsion prepared by using the fat composition.

2. Description of the Related Art

A large amount of laurin fats, such as coconut oil and palm kernel oil, and hydrogenated products thereof have been used in whippable creams, such as whipping cream. Cream prepared by using these fats, solely or with natural fresh cream, has been used for cake icing and the like. Many of them have superior qualities in their physical properties to natural fresh cream, such as excellent melting properties in mouth, freshness and cold feeling, but there are still various points to be improved. A particular problem in a whipped cream is its poor heat resistance. Especially in summer, the whipped cream causes deformation and syneresis, when used to decorate cake or the like. Laurin fats, especially coconut oil, contains only a small amount of long-chain unsaturated fatty acids, such as oleic acid and linoleic acid. Therefore, their heat resistance are not so improved ever when extremely hydrogenated. In addition, there is a method to give heat resistance to laurin fats by adding a high melting point fraction of liquid oils or extremely hydrogenated oils to the laurin fats, but it is known that this method deteriorates melting properties of cream in mouth.

Though a trial has been performed to obtain a hardstock fat of margarine by introducing long-chain fatty acids to laurin fat (EP 0170431), no trial has been done to improve melting properties in mouth and heat resistance of a whippable cream.

SUMMARY OF THE INVENTION

The present invention provides a whippable o/w emulsion which has good heat resistance and excellent melting properties in the mouth.

It is believed that excellent melting properties in the mouth, freshness and cold feeling of a whippable o/w emulsion prepared by using laurin fats are derived from middle-chain fatty acids with 8–12 carbon atoms. Hence, the inventors have found that a novel fat composition can be prepared by reserving middle-chain fatty acids, which occupy more than half of fatty acids especially in their 2-position as they are, and introducing a small amount of long-chain fatty acids with 16 or more carbon atoms to the fats, and that thereby a whippable o/w emulsion, which is imparted excellent melting properties in mouth and heat resistance, can be prepared.

That is, the present invention relates to a fat composition containing 25–60% of glycerides, of which constituent fatty acid residue has not more than 38 total carbon atoms, 25–50% of glycerides, of which constituent fatty acid residue has 42–46 total carbon atoms, and 5–25% of glycerides, of which constituent fatty acid residue has not less than 48 total carbon atoms. And the present invention relates to a whippable o/w emulsion prepared by using the fat composition.

The fat composition of the present invention contains 25–60% of glycerides, of which constituent fatty acid residue has not more than 38 (normally 30–38) total carbon atoms, 25–50% of glycerides, of which constituent fatty acid residue has 42–46 total carbon atoms, and 5–25% of glycerides, of which constituent fatty acid residue has not less than 48 (normally 48–56) total carbon atoms. % value indicating a distribution of number of carbon atoms in a glyceride is weight %. That is, the fat composition of the present invention is novel in that a content of glycerides, of which constituent fatty acid residue has not less than 38 total carbon atoms, is less than that in laurin fats and is equal to that in milk fat, and a content of glycerides, of which constituent fatty acid residue has 42–46 total carbon atoms, is more than that in laurin fats and milk fats, and that a content of glycerides, of which constituent fatty acid residue has not less than 48 total carbon atoms, is less than that in milk fats and more than that in laurin fats. The whippable o/w emulsion prepared by using the fat composition has excellent melting properties in mouth, freshness, cold feeling, and a good heat resistance. When a content of glycerides, of which constituent fatty acid residue has not less than 48 total carbon atoms, are excess, a whippable o/w emulsion has good heat resistance, but has inferior melting properties in mouth. Therefore, to improve both heat resistance and melting properties in mouth, a content of glycerides, of which constituent fatty acid residue has 42–46 total carbon atoms, and glycerides, of which constituent fatty acid residue has not less than 48 total carbon atoms, should be in the range mentioned above.

The fat composition of the present invention has following properties when prepared according to a process described below: more than 40%, preferably more than 50% fatty acids at 2-position of triglycerides is lauric acid, and 1,3-fatty acids are randomly distributed between these positions. And also, solid fat content (SFC) is 45–70% (at 20° C.) and 10–45% (at 30° C.). Slipping point (in the United States, called as Sofning point) is 35–45° C.

An example of preparation of the fat composition of the present invention is as follows: The fat composition is prepared by mixing laurin fats or hydrogenated forms thereof with fatty acids containing 16–24 carbon atoms or esters thereof, or fats rich in glycerides which contain fatty acid residues with 16–24 carbon atoms, transesterifying them by a conventional method, in the presence of lipase having 1,3-specificity, and extremely hydrogenating them according to a conventional method, if needed.

As for laurin fats, it is most preferred that coconut oil or hydrogenated form thereof, wherein lauric acid is most abundant at the 2-position, is used.

As for fatty acids with 16–24 carbons or esters thereof, stearic acid, palmitic acid, or ethylester or methylester thereof are exemplified. As for fats rich in glycerides which contain fatty acid residues with 16–24 carbon atoms, vegetable oils, such as soybean oil, rape seed oil, palm oil or fractionated oils thereof are exemplified.

More definitely, when laurin fats or hydrogenated products thereof, and fatty acids or esters thereof are raw materials, it is preferred to mix at a weight ratio between 60:40 and 80:20 (laurin fats or hydrogenated forms thereof : fatty acids or esters thereof). When laurin fats or hydrogenated products thereof, and fats rich in glycerides which contain fatty acid residues with 16–24 carbon atoms are raw materials, it is preferred to mix at weight ratio between 70:30 and 90:10 (laurin fats or hydrogenated products thereof: fats rich in glycerides with fatty acid residues containing 16–24 carbon atoms).

As for lipases specific to 1,3-position, known ones, for example from Rhizopus, Aspergillus, Penicillium, Candida, Pseudomonas, or Mucor, can be used. Procedures for lipases having 1,3-selectivity, lipase preparations, or method of transesterification using them, can be performed, according to the procedures described in, for example, JP,A,52-104506, JP,A,55-71797, JP,A,55-84397, JP,A,56-127094, JP,A,56-163196, JP,A,57-78496, JP,A,59-500649, JP,A,60-19495.

When the fat composition is prepared by random transesterification, the composition will contain much triglycerides, such as tristearin, wherein each constitutive fatty acid is long-chain and contains 16–24 carbon atoms.

The whippable o/w emulsion prepared by using such a fat composition will have heat resistance, but have inferior melting properties in the mouth. When a content of triglycerides, which contain both long-chain fatty acids and middle-chain fatty acids, i.e., triglycerides consisting of fatty acids with different chain lengths, is increased, "firmness" of the whippable o/w emulsion (crumbling to make handling difficult) will be prevented. Hence, it is preferred that transesterification selective to 1,3-position is carried out.

When laurin fats rich in glycerides which contain fatty acid residues with 16–24 carbons are raw materials, it is preferred that extreme hydrogenation is carried out after transesterification of mixed fats. When separately hydrogenated fats are transesterified, elevation of the reaction temperature and use of solvents are required, which results in disadvantage in cost. Hence, it is preferred that fats are extremely hydrogenated after transesterification.

Such fat composition obtained as mentioned above may be used to prepare a whippable o/w emulsion.

In the present invention, "whippable o/w emulsion" is a creamy material, prepared by processing basic materials (the fat composition mentioned above, proteins, sugars and water) to be an emulsion by an aid of an emulsifier. It is also called "cream for whipping". When the whippable o/w emulsion is whipped by a foaming apparatus or a mixer for foaming, it becomes, what is called, "whipped cream" or "whip cream".

Fat content of the foaming o/w emulsion of the present invention is normally in a range of 20–50% based on whole emulsion.

As proteins, much proteins from non-fat solids are normally used. Non-fat solids are necessary to stabilize the emulsified state as an o/w emulsion as well as to impart milk flavor to the cream. Examples of these non-fat solids are skim milk powder, whole milk powder, raw cream, milk and sweetened condensed milk. Other proteins, such as casein, lactalbumin and vegetable proteins can be used. Alternatively, skim milk powder or whole milk powder may be Maillard-treated. Such non-fat solids are used in an amount of 1–15%, preferably 3–8% based on the total weight.

Sugars are essential when the whippable o/w emulsion of the present invention is transported as fillings for breads or cakes at room temperature or under chilled condition. That is, to preserve the whipped materials for long time, decrease in water activity is required, therefore, addition of sugars is needed. Examples of sugars are glucose, maltose, sorbitol, sucrose, fructose, saccharified reduced starch, various thick malt syrups and the like. One of these sugars may be used, or more than one of them may be mixed to be use. In such cases, it is preferred that the amount of sugars to be added is less than 50% based on whole emulsion, calculated in an anhydrous material, and that a suitable amount of sugars is added according to the use. When more than 50% of sugars are used, viscosity of the whippable o/w emulsion increases, and various problem, such as a trouble in transportation by a pump in production step, will occur.

Furthermore, emulsifiers, various salts, stabilizers and flavors, which are used in known synthetic cream, may be co-existed in the whippable o/w emulsion. As emulsifiers, for example, a suitable amount of soybean lecithin, sucrose fatty acid ester, polyglycerin fatty acid ester, sorbitan fatty acid ester and the like may be used. As salts, a suitable amount of alkali metal salts of phosphoric acid, alkali metal salts of citric acid and the like may be used. As stabilizers, a suitable amount of xanthan gum, guar gum and the like may be used.

The whippable o/w emulsion of the present invention can be prepared according to procedures for preparing normal field creams or imitation creams, and can be sterilized if necessary. Homogenization or stirring can be preformed after or before sterilization. Homogenization may be done by either pre-homogenization or post-homogenization, otherwise combination of both.

The whippable o/w emulsion prepared as mentioned above is suitable as fillings in breads and cakes, and can be used as nappe for a normal decorated cakes or as cream for preparing imitation flowers.

DETAILED DESCRIPTION OF THE PREFERRED EMBODIMENT(S)

As embodiments of the invention, the fat compositions and the whippable o/w emulsions were prepared by conventional methods according to Example 1. Furthermore, occurrence of thickened state after incubating the whippable o/w emulsions at 20° C. for 2 hours and stirring them, over-run after foaming them for 5 minutes using a kenwood mixer, syneresis and maintenance of shape at 20–30° C., and melting properties in mouth, were estimated. Results obtained from comparative experiments are also described in Comparative Example 1 and 2.

Following examples are to be construed as merely illustrative, and not to be limitations of the spirit of the invention. In addition, parts in formulation are represented by weight.

EXAMPLE 1

Eighty parts of palm oil was mixed with 20 parts of rape seed oil, and transesterification selective to 1,3-position was preformed, then extreme hydrogenation was carried out by a conventional method to obtain a fat composition (fat A). Composition and physical properties of fat A is shown in Table 1. Then, according to the formulation below, a whippable o/w emulsion was prepared by using fat A. Firstly, an oily phase was prepared by warming fat A to 70° C., and adding soybean lecithin thereto. Separately, an aqueous phase was prepared by warming water at 60° C., adding sodium hexametaphosphate and sodium bicarbonate thereto to be dissolved, then dissolving or dispersing therein skim milk powder, thick malt syrup and sorbitol in this order. Then, the oily phase and the aqueous phase were mixed together, and sucrose fatty acid ester, xanthan gum and flavor were added thereto, and the mixture was stirred and pre-emulsified at 65–70° C. for 20 minutes using a homo-mixer. Thereafter, the mixture was homogenized under a pressure of more than 100 kg/cm$^2$, treated by ultra high temperature sterilization (UHT) at 1400–150° C. for 4 seconds, and again homogenized under a pressure of 45 kg/cm$^2$, cooled to 12° C., then subjected to aging. Estimation of the whippable o/w emulsion prepared is shown in Table 2

| Formulation (%; w/w) | |
|---|---|
| fat A | 23.6% |
| skim milk powder | 4.0% |
| sugars (*1) | 35.0% |
| water | 36.04% |
| emulsifier (*2) | 0.58% |
| stabilizer (*3) | 1.38% |
| salts (*4) | 0.32% |
| flavor | 0.08% |

(*1) sorbitol, thick malt syrup
(*2) soybean lecithin, sucrose fatty acids ester, sorbitan fatty acid ester
(*3) xanthan gum
(*4) sodium hexametaphosphate, sodium bicarbonate

EXAMPLE 2

A fat composition (fat B) was prepared by mixing 70 parts of hydrogenated palm oil with 30 parts of stearic acid, and transesterifying selectively to 1,3-position of the glycerides. Composition and physical properties of fat B are shown in Table 1. Then, a whippable o/w emulsion was prepared according to Example 1, except that fat B was used instead of fat A. Estimation of the whippable o/w emulsion prepared is shown in Table 2.

EXAMPLE 3

A fat composition (fat C) was prepared by mixing 70 parts of palm oil with 30 parts of rape seed oil, transesterifying selectively to 1,3-position, and preforming extreme hydrogenation by a conventional method. Composition and physical properties of fat C are shown in Table 1. Then, a whippable o/w emulsion was prepared according to Example 1, except that fat C was used instead of fat A. Estimation of the whippable o/w emulsion prepared is shown in Table 2.

COMPARATIVE EXAMPLE 1 fat composition (fat D) was prepared by mixing 60 parts of coconut oil with 40 parts of rape seed oil, transesterifying selectively to 1,3-position, and performing extreme hydrogenation by a conventional method. Composition and physical properties of fat D are shown in Table 1. Then, a whippable o/w emulsion was prepared according to Example 1, except that fat D was used instead of fat A. Estimation of the whippable o/w emulsion prepared is shown in Table 2.

COMPARATIVE EXAMPLE 2

One hundred parts of coconut oil was extremely hydrogenated to obtain fat E. Composition and physical properties of fat E are shown in Table 1. Then, a whippable o/w emulsion was prepared according to Example 1, except that fat E was used instead of fat A. Estimation of the whippable o/w emulsion prepared is shown in Table 2.

In reference to Table 2, the whippable o/w emulsion from Examples 1–3 had good heat resistance and excellent melting properties in mouth. The whippable o/w emulsion from Comparative Example 1 had heat resistance as good as from Examples 1–3, but had inferior melting properties in mouth, therefore it was intolerable as food. The whippable o/w emulsion from Comparative Example 2 had melting properties as good as from Example 1–3, but had very poor heat resistance.

EFFECT OF THE INVENTION

The present invention provides a whippable o/w emulsion used in whipping cream and the like, which possesses good heat resistance as well as excellent melting properties in the mouth, freshness and cold feeling, and provides a fat composition suitable to be applied to the emulsion.

TABLE 1

Compositions and physical properties of fat A–E

| | fat | distribution of number of carbon atoms | | | SFC (%) | | slipping point (° C.) |
|---|---|---|---|---|---|---|---|
| | | -38 | 42–46 | 48- | 20° C. | 30° C. | |
| Example 1 | A | 39.9 | 33.0 | 13.8 | 63.6 | 32.6 | 36.2 |
| Example 2 | B | 34.5 | 36.6 | 17.3 | 63.4 | 37.7 | 36.0 |
| Example 3 | C | 30.5 | 36.4 | 22.0 | 68.2 | 39.7 | 42.0 |
| Comparative Example 1 | D | 22.5 | 38.5 | 28.5 | 72.0 | 46.0 | 46.0 |
| Comparative Example 2 | E | 75.8 | 11.0 | 2.3 | 45.4 | 7.5 | 31.0 |

TABLE 2

Estimation of the whippable o/w emulsions

| | fat | viscosity (CPS) | occurrence of thickened state | time for foaming | O.R.(%) | maintenance of shape | | | state of syneresis* | | | melting properties in mouth |
|---|---|---|---|---|---|---|---|---|---|---|---|---|
| | | | | | | 20° C. | 25° C. | 30° C. | 20° C. | 25° C. | 30° C. | |
| Example 1 | A | 880 | no | 9'29" | 140 | AA | AA | A | — | — | — | excellent |
| Example 2 | B | 980 | no | 10'38" | 144 | AA | AA | A | — | — | — | excellent |
| Example 3 | C | 850 | no | 12'28" | 150 | AA | AA | A | — | — | — | excellent |
| Comparative Example 1 | D | 938 | no | 14'09" | 150 | AA | AA | A | — | — | — | inferior |
| Comparative Example 2 | E | 920 | no | 12'15" | 148 | A | B | C | ± | + | + | excellent |

TABLE 2-continued

Estimation of the whippable o/w emulsions

| fat | viscosity (CPS) | occurrence of thickened state | time for foaming | O.R.(%) | maintenance of shape | | | state of syneresis* | | | melting properties in mouth |
|---|---|---|---|---|---|---|---|---|---|---|---|
| | | | | | 20° C. | 25° C. | 30° C. | 20° C. | 25° C. | 30° C. | |

*maintenance of shape, state of loss of water; represent the states when imitation flowers (prepared using a whipped material) were kept at 20° C., 25° C. and 30° C. for 24 hours.
maintenance of shape
AA: best, without disintegration
A: good, almost without disintegration
B: with slight disintegration
C: bad, with disintegration
state of syneresis
+: occurred
±: slightly occurred
−: not occurred

What is claimed is:

1. A fat composition comprising an esterified product of lauric fats or hydrogenated forms thereof with (1) fatty acids containing 16–24 carbon atoms or esters thereof or (2) fats rich in glycerides which contain fatty acid residues with 16–24 carbon atoms. said composition comprising:
   (a) 25–60% of glycerides, whose constituent fatty acid residues have not more than 38 total carbon atoms;
   (b) 25–50% of glycerides, whose constituent fatty acid residues have 42–46 total carbon atoms; and
   (c) 5–25% of glycerides, whose constituent fatty acid residues have not less than 48 total carbon atoms,
   wherein more than 40% of the constituent fatty acid residues at the 2-position of the glycerides are lauric acid, and
   wherein the fat composition is prepared by mixing lauric fats or hydrogenated forms thereof with (1) fatty acids containing 16–24 carbon atoms or esters thereof or (2) fats rich in glycerides which contain fatty acid residues with 16–24 carbon atoms, and transesterifying them in the presence of a lipase having 1,3-specificity.

2. A fat composition according to claim 1, wherein the solid fat content (SFC) is 45–70% at 20° C., 10–45% at 30° C., and the slipping point is 35–45° C.

3. A whippable oil-in-water emulsion comprising a fat composition according to claim 1.

4. A whippable oil-in-water emulsion according to claim 3, containing 20–50% of fats and oils and 1–15% of non-fat solid.

* * * * *